// Patented Feb. 1, 1949

UNITED STATES PATENT OFFICE 2,460,376

PLASTICIZED LOWER FATTY ACID ESTER OF CELLULOSE

Amerigo F. Caprio, Madison, and William Horback, Newark, N. J., assignors to Celanese Corporation of America, a corporation of Delaware No Drawing. Application October 2, 1945, Serial No. 619,892

7 Claims. (Cl. 106—182)

This invention relates to certain plastic compositions comprising cellulose derivatives and relates more particularly to improved plastic compositions having a basis of cellulose acetate or other organic derivative of cellulose containing a novel modifier or plasticizer therefor.

An object of this invention is the provision of improved plastic compositions having a basis of a synthetic thermoplastic material and containing an agent having a plasticizing action on said composition capable of imparting to the plasticized composition and objects made therefrom good flexibility and good impact strength.

A further object of this invention is to provide a process for the production of films and foils having a basis of a thermoplastic material, such as cellulose acetate or other organic derivative of cellulose, containing a novel plasticizer therefor and imparting to said films and foils improved surface characteristics.

Other objects of this invention will appear from the following detailed description.

Thermoplastic and thermosetting synthetic materials are employed in innumerable commercial applications where weight, impact strength, flexibility, ease of fabrication, low cost and serviceability are among the important factors in determining the choice of material to be employed. In many instances the physical properties of these thermoplastic and thermosetting synthetic materials may be varied widely by incorporating therein plasticizers or other modifying agents. A substantial number of plasticizing agents are known and these agents are employed alone or in combination to produce plastic materials of a wide variety of properties and capable of meeting satisfactorily various conditions of service.

We have now found that by incorporating a halogenated-diphenyl-trichlorethane of the following general formula

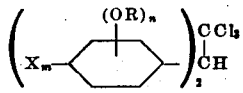

wherein R is an alkyl group, X is a halogen, $m$ is at least 1 and $n$ is 0, 1 or 2 in thermoplastic and thermosetting synthetic materials, said materials may be satisfactorily plasticized and the plasticized materials so obtained exhibit excellent properties. Examples of said plasticizing agents are dichloro-diphenyl - trichloroethane, phenyl-chlorphenyl-trichlorethane or difluoro-diphenyl-trichlorethane, or the nuclear alkoxy substituted derivatives thereof, such as, for example, dichloro-dimethoxy-diphenyl-trichlorethane or dichloro-diethoxy - diphenyl - trichlorethane. By incorporating greater or lesser amounts of said halogenated-diphenyl-trichlorethane, or the alkoxy derivatives thereof, in said plastic compositions, which amounts may constitute 2 to 50% or more, and preferably 10 to 30%, on the weight of the plastic base material, the physical properties of said compositions may be varied considerably. By suitable formulation highly advantageous characteristics may be imparted to materials so plasticized. While said halogenated-diphenyl-trichlorethane plasticizers may be employed as the sole plasticizer in various thermosetting and thermoplastic compositions, they are most advantageously employed in combination with other plasticizing agents such as, dimethyl phthalate, methyl phthallyl ethyl glycollate, triphenyl phosphate, tricresyl phosphate, triacetin, dibutyl phthalate, camphor, naphthalene, paradichloro benzene, castor oil, 2-ethyl-1,3 hexanediol, n-butyl mexityl oxide oxalate, etc. Suitable resins and waxes may also be employed.

We have found that the halogenated-diphenyl-trichlorethanes may be incorporated as plasticizing agents in various thermoplastic and thermosetting synthetic materials with highly desirable results. As examples of thermoplastic and thermosetting synthetic materials with which these plasticizing agents may be compounded, there may be mentioned cellulose derivatives, such as cellulose nitrate, cellulose acetate or other organic acid esters of cellulose, such as, for example, cellulose propionate, cellulose butyrate, cellulose acetate-propionate and cellulose acetate-butyrate and cellulose ethers, such as ethyl cellulose and benzyl cellulose. Other synthetic materials with which it may be employed comprise, for example, polystyrene, polyvinyl compounds, such as polyvinyl acetate, polyvinyl chloride, copolymers of vinyl chloride and vinyl acetate, polyethylene, polyvinylidene chloride and copolymers thereof, polyvinyl acetals, polyvinyl alcohols, polyamides, polybutadiene, polysulfide and polybutene rubbers, polymerized methyl methacrylate, polymerized chloroprene, copolymers of butadiene and styrene, as well as thermosetting phenol-formaldehyde resins, casein, urea and melamine formaldehyde resins.

The halogenated-diphenyl-trichlorethanes as well as their alkoxy derivatives may be incorporated in these thermoplastic and thermosetting synthetic materials in various ways. Where films and foils are being prepared from synthetic material by extrusion or casting operations employing a volatile solvent medium in which the base material is dissolved, the halogenated-diphenyl-trichlorethanes may be added to the solution in the desired amount and the extrusion or casting operation then carried out. Where it is desired to incorporate it in a molding powder, the halogenated-diphenyl-trichlorethanes may be added together with suitable solvents to said synthetic base materials and the whole thoroughly mixed prior to the formation of the molding powder from said material. Dry mixing operations are also satisfactory, employing a machine such as a Banbury mixer. The halogenated-diphenyl-trichlorethane or the alkoxy derivatives thereof may also be applied to the surface of formed materials or objects employing a suitable solvent for the halogenated - diphenyl - trichlorethane compound and immersing the formed materials to be treated in such solution for a time sufficient to incorporate the desired amount of said plasticizing agent in the formed material or object. Where the plastic composition is to be subjected to heat during a forming operation, e. g. during molding, we have found that a stabilizer, such as calcium lactate, dicyandiamide or the like may be advantageously incorporated therein to avoid any decomposition.

Thermoplastic and thermosetting synthetic materials having a halogenated-diphenyl-trichlorethane or an alkoxy derivative thereof incorporated therein by any one or more of the methods indicated above may be formed into films, foils, sheets, rods, tubes and the like by suitable molding, casting, extrusion or other forming operations. Surprisingly enough, we have found, furthermore, that the insecticidal properties for flies, mosquitoes, lice, moths, termites, ants, etc. of the halogenated-diphenyl-trichlorethane plasticizing agents are not lost when incorporated in said base materials. Thus, the latter products may be advantageously utilized for a variety of suitable commercial applications, such as the manufacture of hat boxes, garment bags, coat hangers, closet and drawer lining materials and covers for plants, vegetables, fruits, etc., packaging materials and coated open mesh fabrics are found to be highly resistant to insect penetration and attack.

In order further to illustrate our invention, but without being limited thereto, the following examples are given:

*Example I*

A foil 0.001 inch in thickness is prepared by casting the following composition on a suitable casting surface and evaporating the volatile solvent:

| | Parts by weight |
|---|---|
| Cellulose acetate | 100 |
| Dichloro-diphenyl-trichlorethane | 30 |
| Acetone | 320 |
| Alcohol | 80 |
| Calcium lactate | 3 |

The foil obtained is strong, flexible and translucent with a very slight surface exudation of the dichloro-diphenyl-trichlorethane plasticizer. The physical characteristics of the foils are excellent and they may be employed for any purpose for which said cellulose acetate foils are generally utilized. The cellulose acetate foil prepared in this manner is found to retain the insecticidal properties of the plasticizing compound. The surface exudation of plasticizer is highly desirable when the foil is used as an insect-proof packaging material.

*Example II*

Films or foils may be cast from the following composition:

| | Parts by weight |
|---|---|
| Cellulose acetate | 100 |
| Dichloro-diphenyl-trichlorethane | 15 |
| Methyl phthallyl ethyl glycollate | 15 |
| Acetone | 320 |
| Alcohol | 80 |
| Dicyandiamide | 2 |

Excellent films and foils are obtained.

*Example III*

A film 0.005 inch in thickness is cast from the following composition:

| | Parts by weight |
|---|---|
| Ethyl cellulose | 100 |
| Dichloro-diphenyl-trichlorethane | 15 |
| Acetone | 320 |
| Alcohol | 80 |
| Diphenylamine | 1 |

Films of highly satisfactory physical characteristics and insecticidal properties are obtained.

*Example IV*

A molding powder is prepared from the following composition:

| | Parts by weight |
|---|---|
| Cellulose acetate | 100 |
| Dimethyl phthalate | 20 |
| Dichloro-diphenyl-trichlorethane | 10 |
| Calcium lactate | 5 |

The molding powder may be molded at 200° C. for 15 minutes to yield excellent molded products of high impact strength and satisfactory color. Objects molded of this molding composition exhibit excellent physical properties.

*Example V*

The following molding composition is prepared:

| | Parts by weight |
|---|---|
| Polystyrene | 100 |
| Dichloro-diphenyl-trichlorethane | 10 |

This molding composition may be molded at 250° C. for 15 minutes to yield clear products of excellent molding characteristics.

*Example VI*

The following casting composition is prepared:

| | Parts by weight |
|---|---|
| Vinyl chloride and vinyl acetate copolymer | 100 |
| Dichloro-diphenyl-trichlorethane | 25 |
| Ethyl methyl ketone (hot) | 350 |

This dope can be cast into excellent films and foils.

Where colored materials or materials exhibiting various effects, for example, a mother-of-pearl appearance, are desired, various pigments, dyes or effect materials such as fish-scale may be incorporated in the plastic composition containing the halogenated - diphenyl - trichlorethane compound.

It is to be understood that the foregoing detailed description is given merely by way of illustration and that many variations may be made therein without departing from the spirit of our invention.

Having described our invention, what we desire to secure by Letters Patent is:

1. A composition of matter consisting essentially of a lower fatty acid ester of cellulose and having incorporated therein as a plasticizer and in an amount of from 10 to 30% based on the weight of said ester a compound of the following formula

wherein X is a halogen.

2. A composition of matter consisting essentially of cellulose acetate and having incorporated therein as a plasticizer and in an amount of from 10 to 30% based on the weight of said cellulose acetate a compound of the following formula

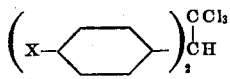

wherein X is a halogen.

3. A composition of matter consisting essentially of cellulose propionate and having incorporated therein as a plasticizer and in an amount of from 10 to 30% based on the weight of said cellulose propionate a compound of the following formula

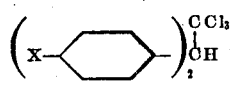

wherein X is a halogen.

4. A composition of matter consisting essentially of cellulose acetate and having incorporated therein as a plasticizer dichloro-diphenyl-trichlorethane in an amount of from 10 to 30% based on the weight of said cellulose acetate.

5. A composition of matter consisting essentially of cellulose propionate and having incorporated therein as a plasticizer dichloro-diphenyl-trichlorethane in an amount of from 10 to 30% based on the weight of said cellulose propionate.

6. A composition of matter consisting essentially of cellulose acetate and having incorporated therein as a plasticizer dichloro-diphenyl-trichlorethane in an amount of from 10 to 30% based on the weight of said cellulose acetate, and containing calcium lactate as a stabilizer.

7. A composition of matter consisting essentially of cellulose propionate and having incorporated therein as a plasticizer dichloro-diphenyl-trichloroethane in an amount of from 10 to 30% based on the weight of said cellulose propionate, and containing calcium lactate as a stabilizer.

AMERIGO F. CAPRIO.
WILLIAM HORBACK.

REFERENCES CITED

The following references are of record in the file of this patent:

UNITED STATES PATENTS

| Number | Name | Date |
|---|---|---|
| 2,244,284 | Britton et al. | June 3, 1941 |
| 2,326,702 | Taylor et al. | Aug. 10, 1943 |
| 2,331,265 | Coleman et al. | Oct. 5, 1943 |

OTHER REFERENCES

"Paint Manufacture," Dec. 1944, pages 353 and 354.

Dittman: "Jour. Economic Entomology," 38 (1945), page 185.

"Cumar," Barret Co. (1936), pages 21, 22, 23, 37, 38 and 39.

Campbell et al.: "Paint Technology," 1944, pages 261 to 263.